JACOB B. RUSSELL
FRANCIS M. PARTRIDGE
INVENTORS

BY

ATTORNEY

JACOB B. RUSSELL
FRANCIS M. PARTRIDGE
INVENTORS

United States Patent Office 2,952,138
Patented Sept. 13, 1960

2,952,138

DUAL CYCLE HEAT POWERED AIRCONDITIONING SYSTEM

Jacob B. Russell, 2135 Ridgeway, Arlington, and Francis M. Partridge, 1240 Arrowhead Drive, Irving, Tex.

Filed Sept. 23, 1957, Ser. No. 685,516

9 Claims. (Cl. 62—238)

This invention relates generally to airconditioning and/or refrigeration systems and more specifically to a system of this type which employs a small heat source as the operational power input.

The primary object of this invention is to provide a heat powered system of this type which includes two separate completely enclosed fluid cycles for advantageous and extremely economical operation.

Another object is to provide a dual cycle refrigeration system in which a different fluid medium is employed in each cycle to take advantage of certain inherent qualities in the separate mediums.

And another object is to provide a fluid medium refrigeration cycle which is powered by a compressor and a second fluid medium power cycle containing a turbine motor which may be powered entirely by the heat of the fluid in the power cycle and wherein the motor is directly connected to and operates the compressor.

A further object is to provide a dual cycle fluid medium heat powered refrigeration system in which the two cycles are interconnected physically at a common heat exchanger where a power transfer occurs but in which cycle the fluids are never in contact.

A still further object is to provide another embodiment of this invention whereby a separate motor is employed to rotate a common shaft on which are located a fluid pump and fluid turbine of the power cycle and a compressor in the refrigeration cycle to assist in starting and operating the power cycle.

An additional object is to provide a fluid medium power cycle for use in refrigeration purposes wherein a very small input heat power will help maintain a continuous circulation in the power cycle and will condition the power fluid for its most effective utilization.

And yet another object is to provide a refrigeration system which includes a closed circuit power cycle using a fluid refrigerant as its operating medium and a closed circuit cooling cycle using a different refrigerant as its operating medium and in which power cycle a turbine cools its refrigerant and simultaneously drives a power cycle pump and a cooling cycle compressor.

And a still further object is to provide a refrigeration system which has all of the advantages of an electrically operated system and yet has an even greater economy than conventional natural gas powered systems.

And another object of this invention is to provide an extremely rugged and durable power cycle which will utilize power which is normally dissipated in conventional refrigeration systems to provide an extreme economy of operation to this system.

In conventional refrigeration systems, the heat removed from the area to be cooled is customarily dissipated in a cooling tower or other remote location and is not employed for any utilitarian purpose. However, in the instant invention this heat is utilized by the heat exchanger to operate the power cycle which in turn operates a turbine which powers the compressor for the refrigerant in the cooling cycle. In order to accomplish this satisfactorily it is necessary to introduce a small amount of heat to the powerant after it has passed through the heat exchanger to remove any liquid particles therein and increase both the pressure and heat content prior to its entry to and operation of the turbine which powers both the compressor of the cooling cycle and the fluid pump of the power cycle.

These and other objects and advantages will be apparent from an examination of the following specification and drawings in which.

Figure 1:
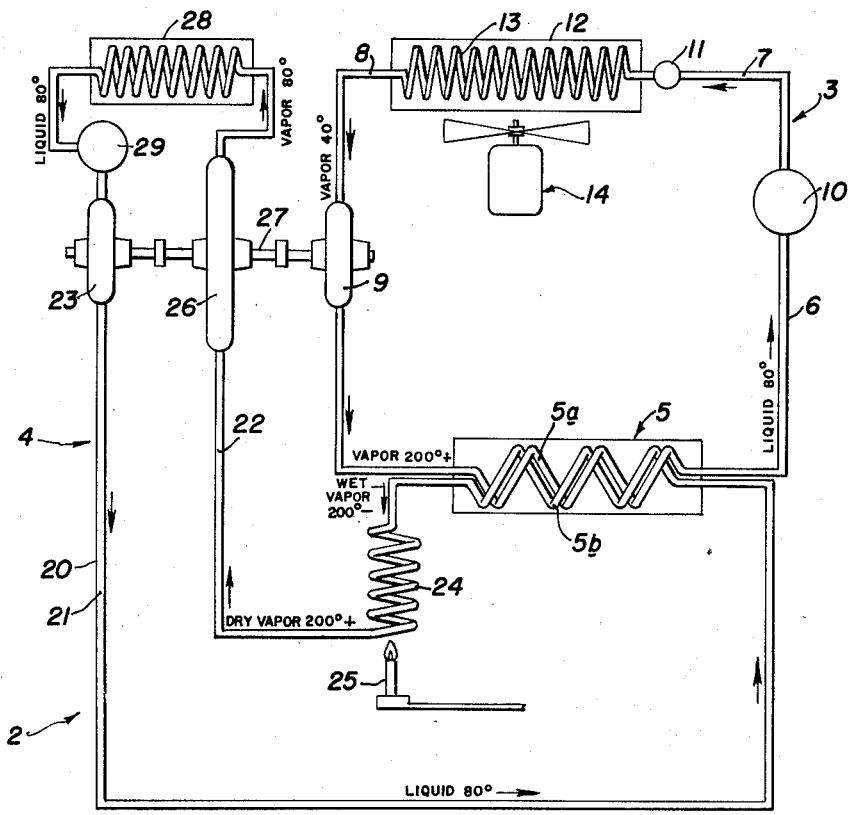
Figure 1 represents a plan view of the refrigeration system of this invention partly in schematic and showing the relative location of the structural components.

Referring now more particularly to the characters of reference on the drawing it will be observed that the complete refrigeration system of this invention indicated generally at 2, consists basically of a self-contained cooling cycle 3 and an integral self-contained power cycle 4 having a heat exchanger 5 which is in common with the cooling cycle 3.

The cooling cycle 3 includes a circuit line 6 in which the refrigerant fluid medium circulates either as a liquid, identified at 7, or as a vapor, identified at 8. The vapor 8 is compressed and considerably heated in a rotary type compressor 9 and then passes through one set of coils 5a in the counter-flow heat exchanger 5 and emerges as a liquid 7 which then passes into and through a conventional accumulator 10 to the expansion valve 11 whereat it is rapidly expanded and returns to its vapor form and passes through the evaporator 12 at a greatly reduced temperature so that the air to be cooled will give up considerable heat as it is forced over the coils 13 by a conventional fan 14. The heat absorbing vapor 8 is then circulated into the suction side of the compressor 9 whereafter it repeats the cycle described.

The power cycle 4 includes a circuit line 20 in which the powerant fluid medium circulates either as a liquid 21 or as a vapor 22. The liquid 21 and indirectly the vapor 22 is circulated in the power cycle 4 by the action of a positive displacement fluid pump 23 which forces the liquid 21 through the second set of coils 5b of heat exchanger 5 wherein the liquid 21 absorbs a sufficient amount of heat from the vapor 8 in the adjacent coils 5a to convert the liquid 21 into a hot wet vapor as it leaves the coils 5b and passes into the coils 24 which comprise an after heater to permit the small heat source identified at 25 to dry out the vapor 22 prior to its being delivered to the turbine 26 in a dry state and at an increased temperature. In turbine 26 the energy of the hot dry vapor 22 in the form of heat and pressure is used to rotate the turbine 26 and consequently the fluid pump 23 and the compressor 9 since these components are on a common shaft 27 with the turbine 26. The vapor 22 emerges from the turbine 26 at a greatly reduced temperature and pressure and passes in the direction shown by the arrows in Figure 1 to a condenser 28 wherein it is converted back to the form of liquid 21 and delivered to and through the accumulator 29 back to the suction side of fluid pump 23 for recirculation in the circuit 20. The accumulator 29 will prevent surges in the power cycle and the pump 23 isolates the higher downstream pressure from the lower upstream pressure.

The small figures shown adjacent the circuits 6 and 20 represent the temperatures of the liquids and vapors in these two circuits at various points throughout their respective fluid cycles for one specific design of construction. It should be borne in mind that the actual heat content cannot be measured by the temperature alone since other physical characteristics are also involved and large heat transfers are effected when a liquid is converted into a vapor and vice-versa. But the temperatures are shown to indicate that heat transfers are taking place and they are given for purposes of explanation only and do not limit the invention to any general or specific values.

It has been determined that the specific fluid medium used in the cooling cycle 3 is not necessarily the one heat suited for use in the power cycle 4. In fact certain refrigerants are definitely not suited for use as powerants. One specific combination of fluids has been found in the utilization of Freon 12 as the refrigerant in cycle 3 and the use of methyl chloride as the powerant in cycle 4.

Figure 2:
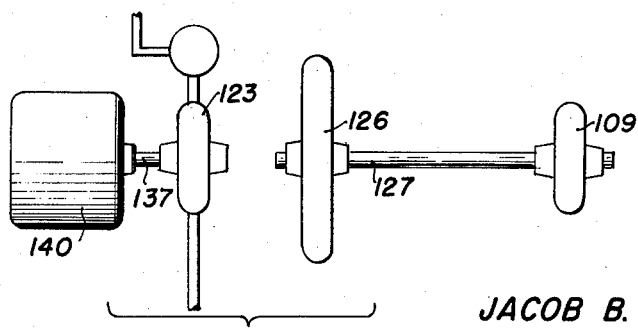
Figure 2 is a fragmentary detail view of the pump and turbine in a second embodiment of the invention.
Figure 3:
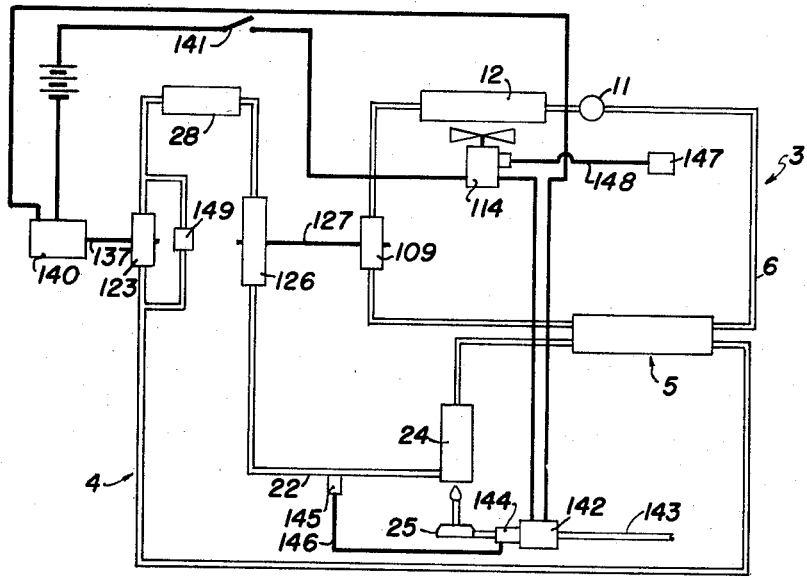
Figure 3 is a schematic diagram showing both the fluid circuits and the electrical circuit of the embodiment of Figure 2.

In the embodiment shown in Figures 2 and 3, the fluid pump 123 is connected by an extension of its shaft 137 to a motor 140 which is preferably electrically operated so that by the engagement of a switch 141, the entire cycle may be started by the simultaneous engagement of motor 140 which opens the full supply of gas from line 143 to be available to heat source 25. However, since it is not desirable or necessary for the flame of source 25 to burn at its maximum intensity at all times there is a thermostatically controlled valve 144 in the outlet side of valve 142 to provide an intensity control for heat source 25. Both valves 142 and 144 will permit passage at all times of a sufficient quantity of gas to provide a pilot light at heat source 25. The motor 140 may also be equipped with a thermostat control 145 to permit it to be cut off when not needed.

The thermostat bulb unit 145 is located in the output line 22 coming from the after heater 24 and this unit 145 is connected by line 146 to the thermostatic valve 144 so that the heat supplied by heat source 25 is controlled by the output temperature in line 22 as it leaves the after heater 24.

The system shown in Figure 1 is partially self modulating due to the fact that the amount and temperature of the room air which passes over the coils 13 determine the rate of flow through the thermo-expansion valve 11 and consequently the rate of flow through the compressor which automatically determines the work load on the turbine which then determines the governor setting on the turbine and the rate of flow of fluid through the turbine. The temperature of this fluid being regulated by an automatically controlled flame regulates the power input to the turbine. In this manner the output of the two systems are self-regulating.

The system shown in Figure 3 is made fully self-modulating by the addition of a room air thermostat 147 which is connected by line 148 to the variable speed fan motor 114 so that the latter is directly controlled by the room temperature, and will reduce speed in response to a decrease in room temperature and when the amount of air passing through evaporator 12 is thus decreased, the action described above for the partially self-modulation is thus accentuated to the point that the system now becomes fully self-modulating. The illustrated modified form of the invention includes a compressor 109 which corresponds with compressor 9 of Figure 1, and turbine 126 which corresponds with the previously described turbine.

Another method of obtaining self-modulation is to regulate the flow of fluid delivered by the fluid pump 140 and this can be accomplished by the inclusion of a thermostatically controlled bypass valve 149 which will then reduce the quantity of powerant passing into heat exchanger 5. A similar flow regulation may be installed on the refrigerant cycle.

Figure 4:
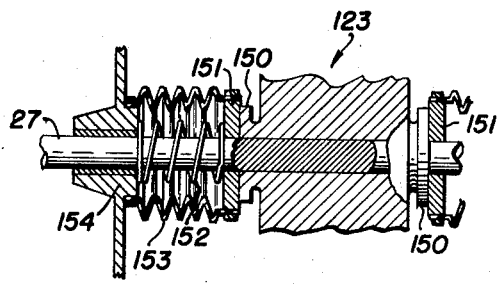
Figure 4 is an enlarged view of the special seal required on the otherwise conventional rotary turbine of Figure 1.

Figure 4 shows a fluid tight seal modification which is necessary to permit the use of a conventional turbine in this system. The shaft 27 of turbine 26 includes a shoulder 150 which abuts a carbon ring 151 and has a flush fit against the outward face of shoulder 150 but which ring 151 does not rotate but is held into sliding engagement with shoulder 150 by spring 152. A bellows 153 operates between the turbine housing boss 154 and the carbon ring 151 to thus prevent any leakage around shaft 27 at the boss 154.

The invention is not limited to the exemplary construction herein described and shown, but may be made in various ways within the scope of the appended claims.

What is claimed is:

1. A heat powered refrigeration system comprising: a closed cooling cycle having a liquid phase portion and a vapor phase portion and including a cooling unit and a compressor, a closed power cycle having a liquid phase portion and a vapor phase portion and including a fluid pump and a turbine motor, a counterflow heat exchanger common to both closed cycles, and means to utilize heat from the cooling cycle to at least partially actuate the power cycle.

2. A heat powered refrigeration system comprising: a closed cooling circuit, a closed power circuit, and a counterflow heat exchanger common to both closed circuits; a fluid in each circuit said fluids each having a liquid phase portion and a vapor phase portion in its respective circuit, means to circulate the power cycle fluid, and means operated entirely from said power cycle to circulate fluid in said cooling circuit.

3. A heat powered refrigeration system comprising: a closed cooling circuit having a cooling unit therein and including a refrigerant having liquid and vapor phases in separate portions thereof, a closed power circuit having a heat source therein and including a refrigerant having liquid and vapor phases in separate portions thereof, a counterflow heat exchanger common to both circuits, controlled means including said heat exchanger and said heat source to cause fluid to circulate in said power circuit and additional means between said circuits to cause fluid to circulate in said cooling circuit.

4. A heat powered refrigeration system comprising: a closed cooling circuit having a cooling unit therein and including a refrigerant having liquid and vapor phases in separate portions thereof, a closed power circuit having a heat source therein and including a refrigerant having liquid and vapor phases in separate portions thereof, said cooling circuit and said power circuit passing through a common counterflow heat exchanger whereby heat is removed from said cooling circuit and heat is added to said power circuit and whereby each of said refrigerants undergoes a change of state, a condenser in said power circuit, an after heater and a fluid motor in said power circuit between said heat exchanger and said condenser, a fluid pump in said power circuit between said condenser and said heat exchanger, a compressor in said cooling circuit, and a common shaft connecting said motor, pump, and compressor whereby fluid circulating in said power circuit will cause said motor to rotate and consequently and simultaneously rotate said pump and compressor.

5. A heat powered refrigeration system as in the next preceding claim wherein said fluid is in a liquid form in said power circuit from said condenser to said heat exchanger, and is in the form of vapor from said heat exchanger to said after heater, wherein it converts to a dry vapor and remains as such until it enters said condenser.

6. A heat powered refrigeration system as in claim 4, wherein said cooling circuit includes an evaporator and an expansion valve and wherein said cooling circuit fluid is in a vapor form from said evaporator to said heat exchanger wherein it is converted due to the heat loss therein to a liquid form and remains a liquid until it reaches said expansion valve for reconversion to a vapor form.

7. A heat powered refrigeration system comprising: a closed cooling circuit having a cooling unit therein, a closed power circuit having a heat source therein, a fluid known as Freon 12 in said cooling circuit and a fluid known as methyl chloride in said power circuit, said cooling circuit and said power circuit passing through a common heat exchanger whereby heat is removed from said cooling circuit fluid and heat is added to said power circuit fluid and whereby each of said fluids undergoes a change of state, a condenser in said power circuit, an after heater and a fluid motor in said power circuit between said heat exchanger and said condenser; a fluid pump in said power circuit between said condenser and said heat exchanger, a compressor in said cooling circuit, and a common shaft connecting said pump, and compressor whereby fluid circulating in said power circuit will cause said motor to rotate and consequently and simultaneously rotate said pump and compressor.

8. A heat powered refrigeration system as defined in claim 2 and wherein said means to circulate the power cycle fluid is comprised of a pump in said power circuit, an electric motor connected therewith and means controlling the r.p.m. of said electric motor.

9. A heat powered refrigeration system as defined in claim 2, and wherein said means to circulate the power cycle fluid is comprised of a pump in said power circuit, an electric motor connected therewith and means controlling the rate of flow of said power fluid.

References Cited in the file of this patent

UNITED STATES PATENTS

| | | |
|---|---|---|
| 1,214,255 | Altenkirch | Jan. 30, 1917 |
| 1,871,244 | Steuart | Aug. 9, 1932 |
| 2,491,314 | Hopkirk | Dec. 13, 1949 |
| 2,721,728 | Higgins | Oct. 25, 1955 |